Sept. 15, 1964 A. T. CASEY ETAL 3,148,694
FLUID EJECTOR VALVE
Filed Dec. 13, 1961
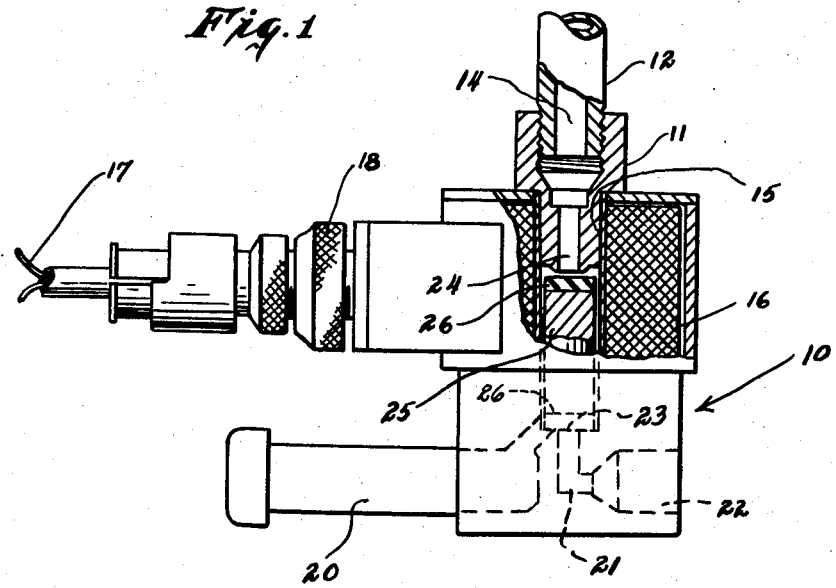
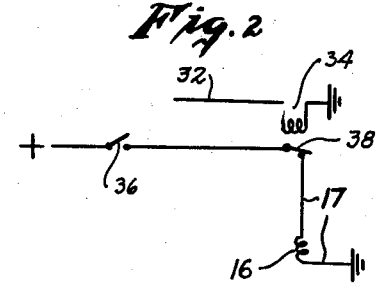
INVENTORS
AUSTIN T. CASEY
FRANK E. CASEY
BY
Darby & Darby
ATTORNEYS

3,148,694
FLUID EJECTOR VALVE
Austin T. Casey, 915 Harcourt, Grosse Pointe, Mich., and Frank E. Casey, 19 Lanark Road, Yonkers, N.Y.
Filed Dec. 13, 1961, Ser. No. 158,975
4 Claims. (Cl. 137—203)

This invention relates to fluid ejector valves and more particularly to a valve which is designed to remove fluids and other foreign matter from compressed air systems.

This application is a continuation-in-part of Casey at al. application Serial No. 766,754, filed October 13, 1958, now abandoned.

The invention particularly relates to air systems such as are used on buses, trucks, tractors, trailers, automotive and similar vehicles and also on stationary equipment utilizing air systems. In such systems there is a certain amount of condensation which produces fluids and sediment which, either alone or in combination, are of a destructive nature and cause malfunction of pneumatically operated equipment, such as brakes, windshield wipers, door operators, etc. A continuous source of clean, dry air is essential to reliable operation of air operated equipment.

An object of this invention is to provide a valve which may be attached to the compressed air system and which will operate automatically to eject fluids and other foreign matter before they can be conveyed to operative equipment.

A further object is to provide a valve of the character described which will function automatically and not require any positive action on the part of the operator to keep the air lines clear, although it is contemplated that a separate control may be used to give positive action when desired.

A still further object is to provide a valve which automatically ejects contaminants from air systems and which remains in operative condition under the most severe weather conditions, such as freezing, sleet and snow.

Still another object is to provide a valve which accomplishes all of the above, which is simple in construction, low in cost, high in efficiency, durable, compact and reliable.

The present invention may be actuated by any desired means of making, or breaking, the electric circuit to which the valve is connected. There are many such circuits available on the type of vehicles or equipment mentioned above. Further, a separate switch for positive, or manual control can be utilized, such as a button control mounted on the dashboard or other convenient location.

In its simplest form our invention consists primarily of a valve controlled by an electrical coil which is an integral part of the assembly and which causes the air valve to operate by electromagnetic forces.

In the drawings—

FIG. 1 is a side elevation partly in section of a valve embodying our invention.

FIG. 2 is a diagrammatic view of a simple form of circuit.

Referring more particularly to the drawings, we show in FIG. 1 a valve member 10 which is connected at its upper end 11 to a pipe 12 which in turn would be connected to the air tank or other reservoir via an opening 14 communicating with a chamber 15 surrounded by an electromagnetic coil 16. Coil 16 is energized by a conductor 17 which may be connected by the splash proof fitting 18. Chamber 15 at its lower end is connected to an accumulator chamber 20 and is also connected to a pipe 21 leading to the exhaust 22. The top of the pipe 21 is defined as a valve seat 23 while the bottom of the pipe 12 leading to the chamber 15 defines a valve seat 24.

Positioned within the chamber 15 is a valve plunger 25 of magnetic material and provided with suitable packing 26. Plunger 25 and chamber 15 are constructed to allow free flow of liquid past plunger 25. To accomplish this, plunger 25 or the walls of chamber 15 could be fluted or plunger 25 could have a square or multi-sided cross section and chamber 15 could be circular in cross-section or vice versa. Advantageously, both ends of plunger 25 are recessed to receive valve packing 26 of resilient material, such as synthetic rubber for engagement with valve seats 23 and 24 respectively.

Valve 10 controls the flow of fluids, such as air, from pipe 12 to pipe 21. When the coil 16 is energized, plunger 25 is drawn upwardly and maintains valve plug 30 sealingly against valve seat 24 to seal off the tank and prevent any air from escaping therefrom. When the circuit is broken either by manual means or, if it is connected to the door opening mechanism or the stop light of the vehicle, when the door is opened or the brakes applied, coil 16 is de-energized. The pressure in the tank then forces the plunger 25 downwardly and maintains valve plug 30 sealingly against valve seat 23. With plunger 25 engaging valve seat 23, valve plug 30 is disengaged from valve seat 24, so that pipe 12 is in communication with accumulator 20 through chamber 15 around plunger 25 and allows the passage of air and other material including fluids to flow into accumulator 20. Since the pressure in the tank is normally substantial, the pressure in the accumulator will be built up to substantially the pressure of the reservoir, so that when the circuit is closed again and the coil 16 energized, plunger 25 sealingly engages valve seat 24 and disengages valve seat 23, the foreign matter or fluids in the accumulator are forcibly ejected due to the release of the compressed fluid to the atmosphere forced out through pipe 21 and the exhaust 22, thus eliminating them from the system. If the circuit is connected to the brakes or stop light, this action will be repeated every time the brakes are used without any further effort on the part of the operator. If the circuit is connected to a manually operated button the operation will be repeated whenever the button is pushed. Preferably, the circuit may be connected to both so that the action is automatic. Many operators prefer to have the dual control particularly for starting purposes.

A circuit for accomplishing the objectives of this invention is shown in FIGURE 2. Conductor 32 communicates with a stop light or door open circuit. Coil 34 and switch 38 are the operative elements of a relay. This relay is in the normally closed position. The ignition switch indicated at 36 and the coil of the valve member is indicated at 16. Conductors 17 lead to coil 16 and connect coil 16 to ground. Thus, when the ignition switch 36 is on or closed, coil 16 of the present invention is energized, the plunger is drawn upwardly and prevents air escaping from the valve member 10. When the brake pedal is depressed or the door open, the circuit in conductor 32 is interrupted deenergizing coil 34 of the relay and thereby opening switch 38 and deenergizing coil 16. The pressure in the tank forces plunger 25 downwardly allowing the passage of air to flow into accumulator 20 to build up pressure therein.

Since coil 16 is normally energized except when the contaminants are being ejected, sufficient heat is generated to prevent freezing of valves 10. Plunger 25 is the only moving part and will not freeze even during extreme cold.

From the above, it is understood that the present valve comprises a self-contained unit which may be readily connected to the usual type of air pressure system by connecting the inlet pipe 12 to the reservoir of such a system. Changes may be made to the illustrative construction described above without departing from the spirit

What is claimed is:

1. A valve mechanism comprising a chamber having first, second and third openings therein, said first and second openings being axially aligned and opposed, said third opening being adjacent to said second opening, a first valve seat disposed within said chamber and affixed to the interior end of said first opening, a second valve seat disposed within said chamber and affixed to the interior end of said second opening, a plunger of magnetic material disposed within said chamber and spaced from and longitudinally movable with respect to said first and second valve seats, said plunger having valve closing means on opposite end faces for selectively and sealingly engaging said first and second valve seats respectively, means constituting a path for the flow of fluid through said valve mechanism between said first and third openings and around said plunger when said plunger engages said second valve seat, storage means communicating with said third opening, said plunger being normally biased toward said second opening whereby said valve mechanism is normally opened to the flow of fluid through said path between said first and third openings but closed to the flow of fluid through said first and second openings, and an electromagnetic coil electrically surrounding said chamber, said coil when energized urging said plunger into engagement with said first valve seat and sealingly closing said first opening to open said valve mechanism to the flow of fluid between said second and third openings and close it to the flow between said first and third openings, said electromagnetic coils being normally energized so that said plunger sealingly engages said first opening.

2. A valve mechanism for removing foreign matter from a compressed air system comprising a chamber, a first opening having a valve seat, means connecting said first opening to said system, a second opening having a valve seat and oppositely directed from said first opening, a third opening adjacent said second opening, an accumulator chamber communicating with said third opening, a plunger of magnetic material movable within said chamber between said first and second openings, a coil electrically surrounding said plunger and adapted when energized to force said plunger to sealingly engage said first mentioned valve seat, said coil being normally energized, upon said coil being deenergized pressure from said system forcing said plunger to disengage said first mentioned valve seat and sealingly engage said valve seat of said second opening, and means within said chamber constituting a path for the flow of fluid through said valve mechanism between said first and third openings and around said plunger when said plunger engages said second opening, and means constituting a path from said third opening to said second opening when said plunger engages said first opening for ejecting fluid material within said accumulator.

3. A valve mechanism comprising a chamber having an opening at one end and communicating at its other end with an accumulator chamber and an exhaust port, a magnetic plunger in said chamber, valve seats in said chamber adjacent each end of said plunger, an electric coil electrically surrounding said chamber and normally energized, said plunger when energized urging said plunger sealingly against said one valve seat and when de-energized allowing said plunger to be seated against the valve seat at said other end of said chamber, and means constituting a path from said opening at said one end through said chamber to said accumulator chamber when said plunger is seated against said valve seat at said other end of said chamber.

4. The structure of claim 3 including a source of electric current, said electric coil being electrically connected to said source of electric current, switch means interposed in said electric connection between said source of electric current and said coil, said switch being normally on so as to maintain said coil in the normally energized condition and means for selectably actuating said switch to disconnect said coil from said electric current and thereby de-energize said coil.

References Cited in the file of this patent
UNITED STATES PATENTS

| | | |
|---|---|---|
| 2,316,052 | Dach | Apr. 6, 1943 |
| 2,614,584 | Goepfrich | Oct. 21, 1952 |